US009262783B1

(12) United States Patent
Schöning et al.

(10) Patent No.: US 9,262,783 B1
(45) Date of Patent: Feb. 16, 2016

(54) SYSTEM AND METHOD FOR EVALUATING INPUT BASED ON DYNAMIC GRAMMARS

(71) Applicant: Software AG, Darmstadt (DE)

(72) Inventors: Harald Schöning, Diebug (DE); Juliane Harbarth, Griesheim (DE); Gunther Rademacher, Münster (DE)

(73) Assignee: Software AG, Darmstadt (DE)

( * ) Notice: Subject to any disclaimer, the term of this patent is extended or adjusted under 35 U.S.C. 154(b) by 0 days.

(21) Appl. No.: 14/456,230

(22) Filed: Aug. 11, 2014

(51) Int. Cl.
  G06F 9/45 (2006.01)
  G06Q 30/06 (2012.01)
  G06F 17/27 (2006.01)

(52) U.S. Cl.
  CPC .......... *G06Q 30/0641* (2013.01); *G06F 17/271* (2013.01); *G06F 17/274* (2013.01); *G06F 17/277* (2013.01); *G06F 17/2775* (2013.01); *G06Q 30/0623* (2013.01)

(58) Field of Classification Search
  CPC ....... G06F 8/35; G06F 17/271; G06F 17/274; G06F 17/277; G06F 17/2775; G06Q 10/067; G06Q 30/0623; G06Q 30/0641
  USPC .................................. 717/100–105, 141–144
  See application file for complete search history.

(56) References Cited

U.S. PATENT DOCUMENTS 7,739,228 B1  6/2010  Erickson et al.
7,761,844 B2 *  7/2010  Bove et al. ................... 717/106
7,801,976 B2  9/2010  Hodges et al.
8,943,463 B2 *  1/2015  Zhang et al. ................... 717/101
2010/0169234 A1 *  7/2010  Metzger et al. ............... 705/348

OTHER PUBLICATIONS

Zhang et al., "High-Performance XML Parsing and Validation with Permutation Phrase Grammar Parsers", 2008, IEEE International Conference on Web Services, pp. 286-294.*
Grace A. Lewis et al., "Proceedings of the Fourth International Workshop on a Research Agenda for Maintenance and Evolution of Service-Oriented Systems (MESOA 2010)", Sep. 2011, Carnegie Mellon University, 157 pages.*
De Leusse, Pierre et al., "A governance model for SOA". icws, pp. 1020-1027, 2009 IEEE International Conference on Web Services. 2009.

* cited by examiner

*Primary Examiner* — Ted T Vo
(74) *Attorney, Agent, or Firm* — Posz Law Group, PLC

(57) ABSTRACT

A method and system for evaluating service definitions in a service-oriented architecture (SOA) system which provides service offerings categorized according to service categories using a taxonomy. A specification field receives a formal definition of a service. The formal definition is for inclusion to define one of service offerings of the SOA. A current grammar is determined which is currently in effect as a specification-requirement of acceptable definitions for a service category in which the service is categorized. The current grammar is a common grammar. The system determines whether the formal definition in the specification field is acceptable, by adhering to the current grammar determined to be currently in effect as the specification-requirement for the category of the service. The formal definition is accepted for the service when it is determined to be acceptable according to the current grammar. Otherwise, the formal definition is rejected.

20 Claims, 12 Drawing Sheets

FIG. 12

```xml
- <suit-under-production>
   - <material>
        <fabrics />
        <others />
     </material>
     <state>not started yet</state>
   - <parts>
        <jacket />
        <trousers />
     </parts>
  </suit-under-production>
```

FIG. 14

```xml
- <suit-under-production>
   - <material>
        <fabrics />
        <others />
     </material>
     <state>not started yet</state>
   - <parts>
        <jacket />
        <trousers />
     </parts>
   - <circumstances>
        <time>0</time>
        <costs>0</costs>
        <countries />
     </circumstances>
  </suit-under-production>
```

FIG. 13A

```
- <suit-under-production>
  - <material>
    - <fabrics>
      - <fabric colour="charcoal">
        - <substances>
            <substance>dinocarb</substance>
          </substances>
        - <labels>
            <label>Swiss Organic Fabrics</label>
          </labels>
        - <subfabrics>
            <subfabric>silk</subfabric>
            <subfabric>cotton</subfabric>
          </subfabrics>
        </fabric>
      </fabrics>
    - <others>
        <buttons>black wood</buttons>
      </others>
    </material>
    <state>completed</state>
  - <parts>
    - <jacket>
      - <fabric colour="charcoal">
        - <substances>
            <substance>dinocarb</substance>
          </substances>
```

```xml
      - <labels>
          <label>Swiss Organic Fabrics</label>
        </labels>
      - <subfabrics>
          <subfabric>silk</subfabric>
          <subfabric>cotton</subfabric>
        </subfabrics>
      </fabric>
    </jacket>
  - <trousers>
    - <fabric colour="charcoal">
      - <substances>
          <substance>dinocarb</substance>
        </substances>
      - <labels>
          <label>Swiss Organic Fabrics</label>
        </labels>
      - <subfabrics>
          <subfabric>silk</subfabric>
          <subfabric>cotton</subfabric>
        </subfabrics>
      </fabric>
    </trousers>
  </parts>
</suit-under-production>
```

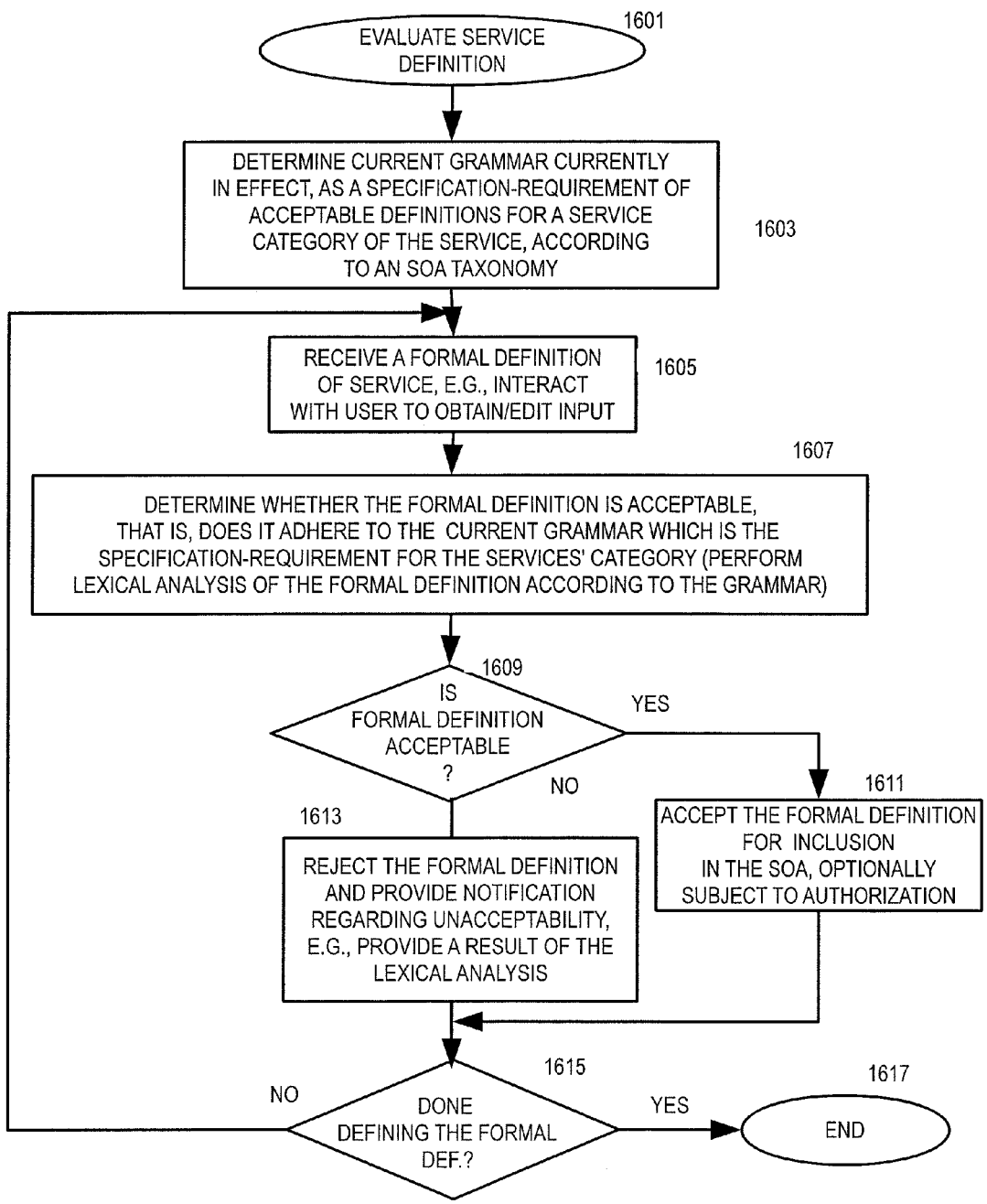

SYSTEM AND METHOD FOR EVALUATING INPUT BASED ON DYNAMIC GRAMMARS

TECHNICAL FIELD

The technical field relates in general to service-oriented architectures and self-describing services.

BACKGROUND

In a service-oriented architecture (SOA) system, which has a process chain of service offerings, each of the service offerings can have its own rules. The SOA system provides a conventional technique to expose pieces of service offerings that might be composable.

Using SOA techniques, a provider can execute a complete process chain for an overall process by combining offerings of different partners that can each supply one or more services to undertake steps of the overall process. For this process, the provider conventionally employs a so-called partner portal that allows the partners to make their respective service offerings known to the provider. Typically, the partner that provides one of the service offerings also provides the self-describing definitions for the service.

The definitions for each of the services are not necessarily confluent, even when the services are in a process chain. Furthermore, each of the offered services might have legal and/or internal restrictions which limit the functioning of the services.

The rapidly expanding number of offered services makes it increasingly difficult to guide service definitions to the needs of the provider.

An SOA governance system is used for activities related to exercising control over services in a SOA. In addition to the service definitions, another of the operational elements of a conventional governance model is an access control infrastructure which is used in order to check authorization, using access control policies and security assertions written in a specialized grammar such as XACML or SecPAL.

As an example of service definitions, consider U.S. Pat. No. 7,801,976, to Hodges et al., which discloses a SOA method to capture service properties in service process profiles, and among other things to interrogate possible services by reviewing service properties captured in the service process profiles. According to Hodges, machine-readable (e.g., XML-based) metadata may be used to capture the self-describing service profiles.

U.S. Pat. No. 7,739,228, to Erickson et al., discloses a method of generating a services repository using a target services roadmap, which receives an identification of an implemented service from the user and maps the implemented service to target services. Erickson uses, among other things, a service description which can be the definition of a reusable business function that endpoints can consume.

These and other known solutions are examples of standard techniques for self-describing services as well as techniques to check these descriptions against certain rules and/or policies.

Nevertheless, the problem remains that the service descriptions are insufficiently flexible and not readily extensible, especially for the purposes of the provider of the process chain which combines offerings of separate partners.

SUMMARY

Accordingly, one or more embodiments provide a method, system and/or non-transitory computer readable medium for evaluating service definitions in a service-oriented architecture (SOA) system which provides service offerings categorized according to service categories using a taxonomy. A processor receives, in a specification field, a formal definition of a service, the formal definition is for inclusion to define one of service offerings of the SOA system. The processor determines a current grammar which is currently in effect as a specification-requirement of acceptable definitions for a service category in which the service is categorized according to a taxonomy of the SOA system, the current grammar being a common grammar. The processor determines whether the formal definition in the specification field is acceptable, by adhering to the current grammar determined to be currently in effect as the specification-requirement for the category of the service. The processor accepts, for inclusion to define the service in the SOA system, the formal definition in the specification field for the service, when the formal definition in the specification field is determined to be acceptable according to the current grammar. The processor rejects, for the service offerings of the SOA system, the formal definition in the specification field for the service, when the formal definition is determined to be not acceptable according to the current grammar.

According to another embodiment, the common grammar is expressed in Extended Backus-Naur Form (EBNF) notation. Further, the processor parses the formal definition, according to the specification-requirement which expresses the common grammar in EBNF notation which determines acceptability of the formal definition.

In yet another embodiment, the processor prompts a user to input an adaption of the current grammar to incorporate the specification-requirement which was received, to provide an adapted grammar for the service; and the processor stores, in the SOA system, the adapted grammar to use as the current grammar for the service.

In still another embodiment, the processor modifies the current grammar to provide an updated grammar; stores, in the SOA system, the updated grammar to use as the current grammar for the service; and notifies partners of the service categories in the SOA of the current grammar which is now updated.

In a further embodiment, the processor modifies the current grammar to provide an updated grammar; stores, in the SOA system, the updated grammar to use as the current grammar for the service; and evaluates, for the service, the formal definition, which was acceptable under a previous grammar, according to the current grammar which is now updated.

In still a further embodiment, there are provided a plurality of different common grammars for the services in the SOA system. The processor generates information about all of possible specification-requirements, which are service properties, which each of the services can provide, from the different common grammars of the services.

In yet still a further embodiment, the processor causes a display to visualize a user interface to input the formal definition. The user interface comprises a specification field to receive text input of the formal definition; and a "check specification" instruction configured to initiate the determining by the processor whether the formal definition in the specification field is acceptable, which returns a message indicating a lexical analysis of the formal definition pursuant to the specification-requirements.

According to another embodiment, there are provided methods according to the above. In a further embodiment, the processor is further configured to perform according to the above methods. Yet another embodiment provides a non-transitory computer readable medium, which can perform a method according to one or more of these embodiments.

One, or a combination of more than one, or all, of the above embodiments, can be combined and provided as a single embodiment.

Moreover, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

BRIEF DESCRIPTION OF THE DRAWINGS

The accompanying figures, where like reference numerals refer to identical or functionally similar elements and which together with the detailed description below are incorporated in and form part of the specification, serve to further illustrate various exemplary embodiments and to explain various principles and advantages in accordance with the embodiments.

FIG. 12 illustrates an XML document which expresses a service chain;

FIG. 13A and FIG. 13B illustrate an XML document which corresponds to a virtual execution of the chain of services of FIG. 12;

FIG. 14 illustrates a possible XML start document for suit-production considering selected "circumstances;"

FIG. 16 illustrates a process to evaluate a service definition.

DETAILED DESCRIPTION

I. Introduction

Figure 1:
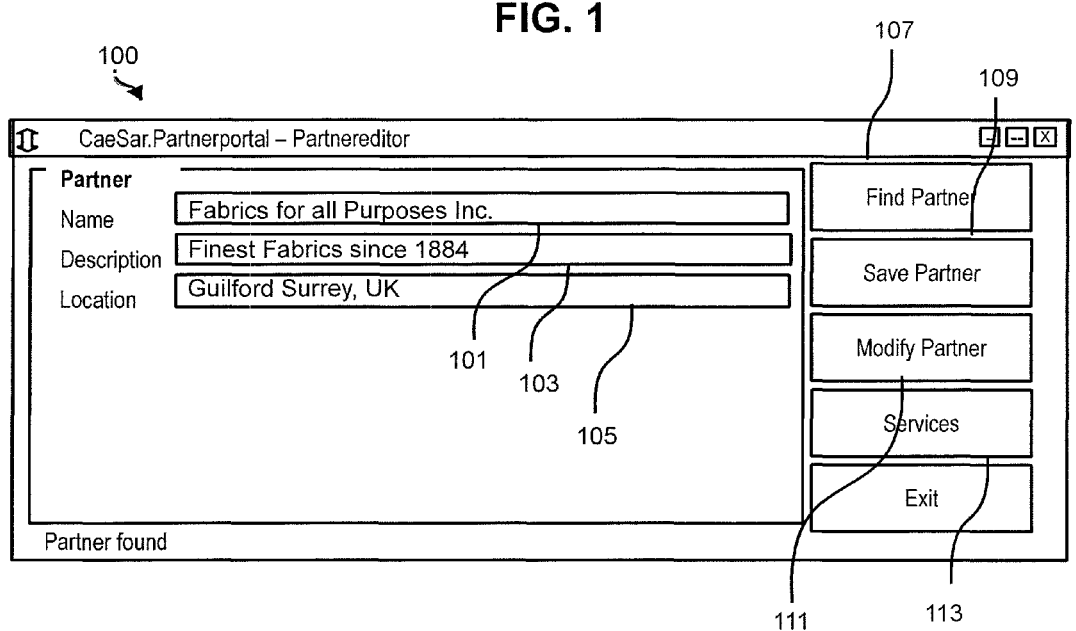
FIG. 1 is a user interface illustrating an entry screen of a partner portal.

In overview, the present disclosure concerns a system for using a common grammar in the context of self-describing services as a part of service-oriented architecture (SOA) governance process, in which detailed information is specified about what each service provider can provide. More particularly, various inventive concepts and principles are embodiments in methods, devices, and/or systems to overcome a problem related to a SOA system in which a provider provides a process chain of services, that combines different service offerings of different service providers which can undertake steps in the process chain of services, with each of the service offerings having certain rules, policies, definitions, categories, and the like, some or all of which may be referred to as properties of one of the services, but in which the properties of one or more of the different service offerings cannot be sufficiently specified using available syntax. In a solution, flexibility of the system can be improved by allowing modification of a specification of the service's properties based on common grammars, to thereby provide a dynamic grammar that can enhance detailed information about the service. The concept can allow modifications, such as by a provider of an overall process chain, to the grammar of one of the possible service offerings in the process chain, possibly with acceptance and/or adaption by the supplier of the service offering. The common grammar can rely on Backus-Naur Form (BNF) or Extended BNF (EBNF).

Accordingly, embodiments disclosed herein provide methods and systems in which service descriptions are sufficiently flexible and readily extensible.

The instant disclosure is provided to further explain in an enabling fashion the best modes of performing one or more embodiments. The disclosure is further offered to enhance an understanding and appreciation for the inventive principles and advantages thereof, rather than to limit in any manner the invention. The invention is defined solely by the appended claims including any amendments made during the pendency of this application and all equivalents of those claims as issued.

One or more embodiments discussed herein can address the aforementioned problems with traditional systems, by providing an emergent system where the partner-provided services are classified using a dynamic taxonomy, which optionally can execute a complete process chain in which service offerings of separate partners can be dynamically combined. This system can automatically judge the suitability of the partner-provided services by specifying the service's properties based on common grammars; these grammars are themselves dynamic.

II. Overview

A service-oriented architecture (SOA) governance system can be used to enable an extendible way to define a specific grammar to negotiate certain conditions among different services in a SOA landscape. The grammar defines the language which specifies how the negotiation should be carried out. Also, modifications of this grammar are possible, such as, if one service has an extra information available that could not be expressed using the current syntax, a suggestion for the appropriate change can be returned, and, if accepted, this additional information becomes part of the new, revised grammar.

There may be a superficial affinity to what is referred to "Policy Negotiation", for example, using XACML as the language of choice. Nevertheless, this approach disclosed herein is inherently extendible, whereas the XACML language is first of all fixed. XML in general, being a markup language, may be useful to implement such a flexible negotiation approach.

A service specification field can be included, as for example according to standard techniques for self-describing services which can check these descriptions against certain rules/policies. For example, the validation of XML with a schema may be a simple task.

Nevertheless, using a "grammar" in this context as part of a SOA governance process is very novel. Certainly, enabling a service description and validation using an extensible common grammar provides many heretofore unexpected advantages over conventional fixed specification techniques, such as permitting a non-supplier to specify the supplier's service.

III. Context

A provider can execute a complete process chain by dynamically combining offerings of separate partners that can each supply one or more services to undertake steps of this overall process. For this process the above provider employs a so-called partner portal that allows the partners to make their respective service offerings known to the provider.

An example of such a process chain is provided herein, for ease of discussion, in which the complete process chain is the production of suits for men. Thus in this example the process chain at a certain time may consist of three steps which are (1) providing the necessary materials (fabric, threads, buttons, etc.), (2) sewing, and (3) preparing for delivery (ironing, folding, etc.). The production of suits for men is merely illustrative of concepts discussed herein, and it is not intended for the concepts to be limited to the specific services discussed herein.

Figure 2:
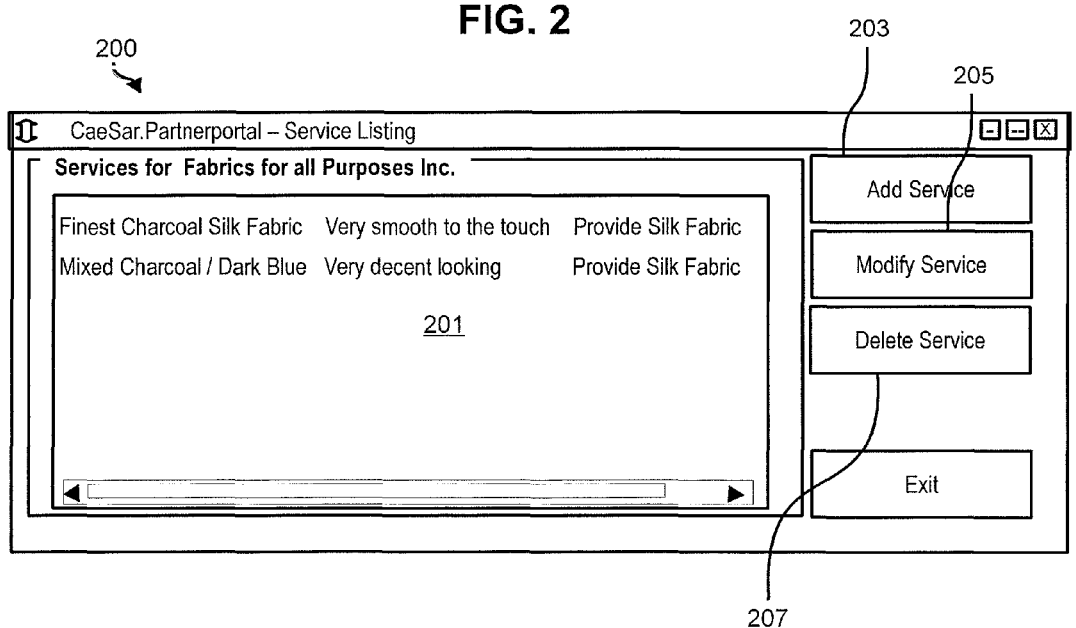
FIG. 2 is a user interface illustrating a screen for an already-provided service description in a partner portal.
Figure 3:
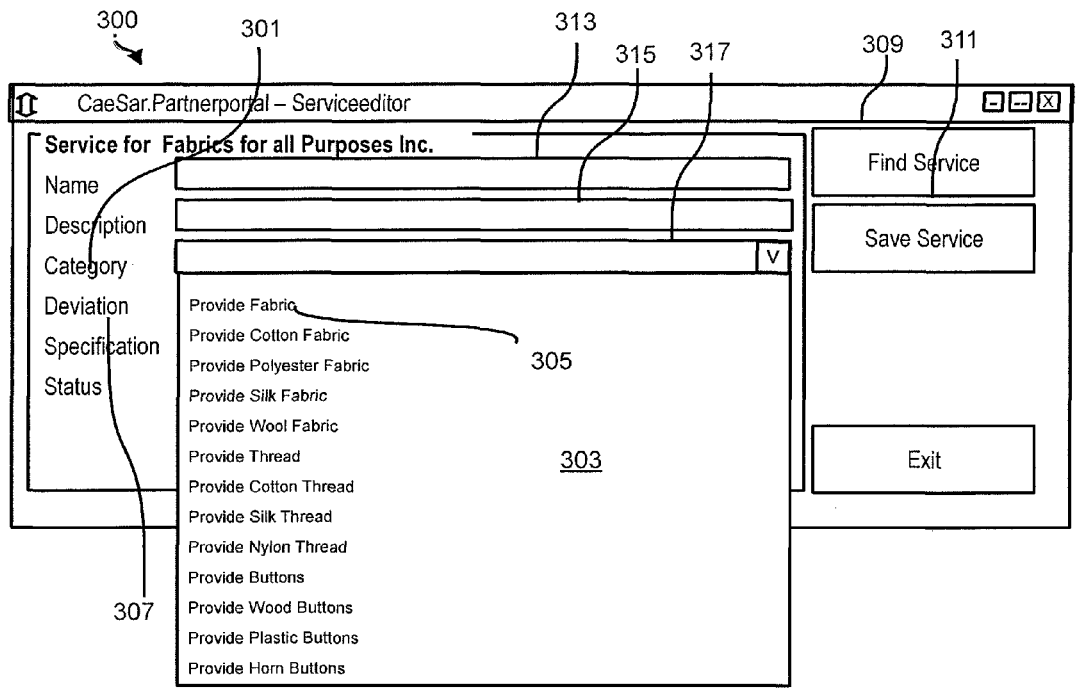
FIG. 3 is a user interface illustrating a screen listing service-categories according to a taxonomy of categories, in a partner portal.
Figure 4:
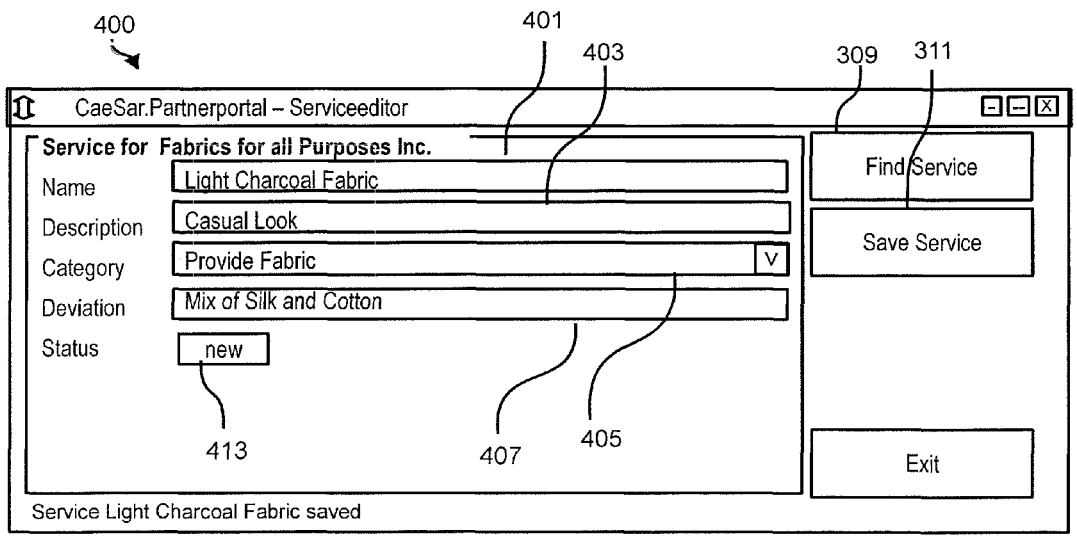
FIG. 4 is a user interface illustrating a screen to add a deviation in a category, in a partner portal.
Figure 5:
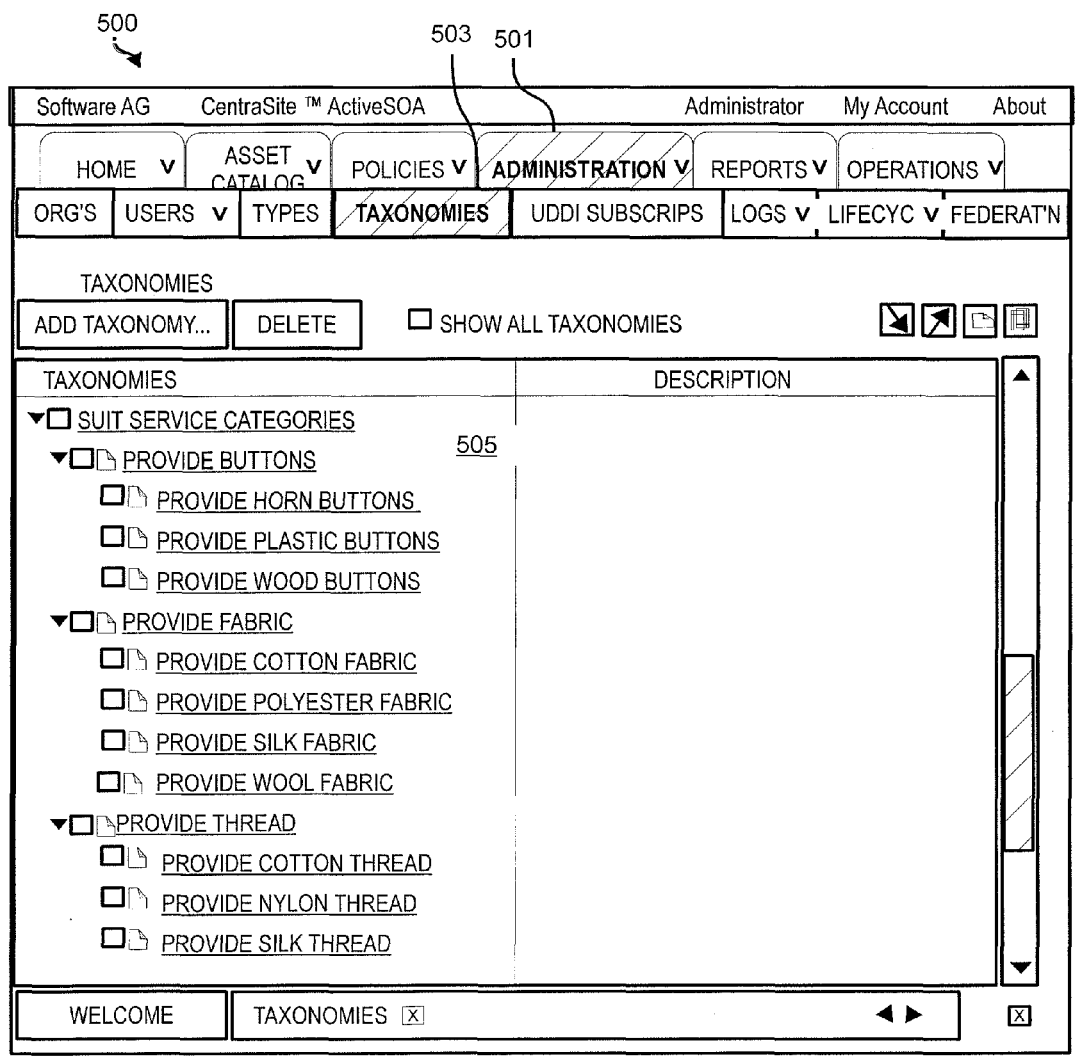
FIG. 5 is a user interface illustrating a screen that lists taxonomies in a service-oriented architectures governance system.

By way of overview, FIG. 1 to FIG. 4 illustrate user interfaces of a partner portal for use in a service-oriented architecture (SOA), beginning at FIG. 1 with the initial screen (Partner Editor), moving in FIG. 2 to a listing of already-provided services for the specified partner (Service Listing), and in FIG. 3 providing a listing of service-categories according to a taxonomy of categories for the specified partner (Service Editor); and in FIG. 4 providing a screen in which a textual description of a not-yet-described service can be added as a deviation of a category which is in the current taxonomy of categories. FIG. 5 is an example of a taxonomy of categories, as provided by an SOA. Each of these is further discussed and described below.

FIG. 1 is a screenshot of a user interface 100 exhibiting an entry screen of a partner portal where a company having the name 101 'Fabrics for all Purposes Inc.' that is already known to the provider enters the portal to maintain its current service portfolio. The user interface 100 also displays other information associated with the company, such as a description 103 of the company and its location 105. The user interface 100 can provide commands related to the partners, here represented by buttons for editing the service partner(s) included in the portal, according to known techniques, such as to find partner 107, save partner 109, modify partner 111, and list services 113 that the named partner provides.

Upon receipt of a selection of the "Services" 113 button in FIG. 1, the system can provide a user interface such as in FIG. 1. FIG. 2 is a user interface 200 illustrating a screen for an already-provided service description in a partner portal. The system can display, on the user interface 200 for viewing by the user, the list 201 of services that were already provided by the partner to a provider, which are thus known to the provider and may or may not become part of an actual production process by the provider.

Still referring to FIG. 2, the partner's service portfolio with the list 201 of services can now be altered by instructing the system to add service 203, modify service 205, or delete service 207. When adding or modifying a service using conventional techniques, the partner which hopes to provide services to be incorporated in a provider's process chain is obliged to categorize its service according to a taxonomy of categories previously established by the provider, thus denoting where within the overall process chain the provided service might fit in.

The screenshot of FIG. 3 illustrates user interface 300 of a service editor which provides a list 303 of service-categories in the realm of material provisioning according to a taxonomy of categories, in a partner portal. In this embodiment, the list 303 of service-categories is a pull-down menu. In this user interface, the name 313 and description 315 fields are empty, for example until a category 317 of service is selected. The user interface also offers commands (here represented by buttons) to find service 309 and save service 311. As discussed below, a service category of "provide fabric" 305 will be chosen in this example. Having chosen a category, the "Deviation" field 307 allows a description of how the service deviates from the category.

Illustrated in FIG. 4 is a user interface 400 in the partner portal, which displays a screen to add a service which is a deviation 407 within a category 405 which was chosen in FIG. 3. The deviation 407 field can receive input from a user, and offers an opportunity for the user to provide a simple text description as to whether and how the actual service deviates from the category 405 chosen. The name 401 and description 403 fields listed in the user interface 400 correspond to the selected service category 405 and are entered to receive a text description typed in by the user of the user interface 400. With the fabric example, there is not yet any category which was previously defined to specify that the fabric is a mixture of different materials. Thus the closest a provider can get is selecting the next higher category of "Provide Fabric" (shown in FIG. 3) and specifying a deviation of one of the predetermined service categories accordingly (shown in FIG. 4). The user can enter text (e.g., "Mix of Silk and Cotton") into the deviation 407 field which describes a deviation of the selected service category 405. The system can receive an instruction to save 311 the service. Also, the system can receive an instruction to find 309 a service input into the name 401, description 403, or category 405, using conventional techniques.

The process is conceived to be emergent in the way that the categories defined are not fixed but may change over time. Such changes might be indicated by the provider by directly changing the category's taxonomy, but may also be derived from customer expectations and/or partner offerings that are not within the spectrum of previously described service categories. The "Deviation" field may be one means for the partners of influencing the spectrum by inputting new or deviant categories which are suggestions that may give rise to new production steps and/or replace production steps/categories.

Another way to support an emergent process driven by more than one party is to allow more than one party access to the category's taxonomy, which can foster a confluent process definition.

The storage of information about the categories can be implemented using conventional techniques. Because the run-time system that actually runs the overall service process is a kind of service-oriented architecture (SOA), a SOA governance system seems appropriate. The SOA known as CentraSite by Software AG is an appropriate example.

FIG. 5 exhibits the categories' taxonomy as shown in the CentraSite Control GUI. Here, a user interface 500 shows a screen with an administration section 501 that manages taxonomies 503 in a service-oriented architectures governance system. Conventionally, the taxonomy 503 provides a hierarchical list 505 of the services which are within the taxonomy. The taxonomy 503 defines categories of the available services.

IV. Problem Presentation

There are three problems with the current approach, that all have to do with the insufficient means provided by current technology to the provider with regard to judging the usability of the partner-offered services automatically.

First, the provider that later on actually uses an offered service as part of its overall process might possibly have certain legal and/or internal restrictions about the functioning of the services. These restrictions, for example, may mean that information pertaining to certain criteria is required for the offered services in order to enable the provider to decide to which degree the offered service is usable. This information—if provided as described below—can possibly be machine-interpretable since the determination as to whether a certain service is fit to be employed for a given customer request can then be made automatically, by a machine.

The set of issues for which more detailed specifications are desirable or necessary, depends upon the category chosen. Referring to the fabric service example, there are a wide variety of possible properties of a fabric which a provider might take an interest in, which may or may not be reflected in the pre-determined service categories. In the above example, one can think of the following which are not pre-determined service categories and are not listed in the taxonomy but might be of interest to the provider:

the robustness of the offered fabrics,
the chemical substances that are applied to the fabric,
whether it can easily be dealt with in further production steps,
for which occasions the fabric is considered appropriate
whether it needs ironing,
whether it may change its color and to which degree,
whether it is waterproofed
and so on.

It is not possible to anticipate every service category that might be of interest, and hence it is not possible to construct a perfect taxonomy with all pre-determined service categories. Because the nature of a taxonomy itself is emergent, that is an ever-changing result of confluent definitions of the parties involved, this also can hold true for the specification-requirements for each category. This is, the specification-requirements are also not fixed. Still, there are certain specification-requirements that are correct at least for one point in time and to which the service provider is recommended to adhere in order to best place its service in the overall service landscape. It would certainly be a disadvantage for a service-providing partner, if a human at the provider needs to ask additional questions to the service-providing partner before a service can be used in the process.

Second, the provider might not fully understand the impact of the concatenation of services, especially when provided by different partners. Thus the specification introduced with the above problem about meeting certain restrictions, might also be useful when trying to automatically understand whether the outcome of one service is a suitable starting point for a second service.

Third, when thus being able to constitute a suitable chain of services, which are automatically detected as being able to produce an outcome that meets certain specifications, and furthermore having automatically made sure that the services in the chain form a proper sequence in the sense that what is produced by a service can be consumed by the subsequent service, it may be desirable to detect which of a set of possible service-combinations is best given some kind of evaluation criteria.

V. Aspects of the Approach

To enable the service providing partner, or other user, to describe a service in a way that the overall system can automatically deal with in the context of the overall process, an interaction allows a user to particularly specify, in a specification field, a formal definition of a particular partner's service offering(s); the formal definition is intended to be in accordance with a common grammar notation that provides a specification-requirement of acceptable definitions, for the service's category.

Figure 6:
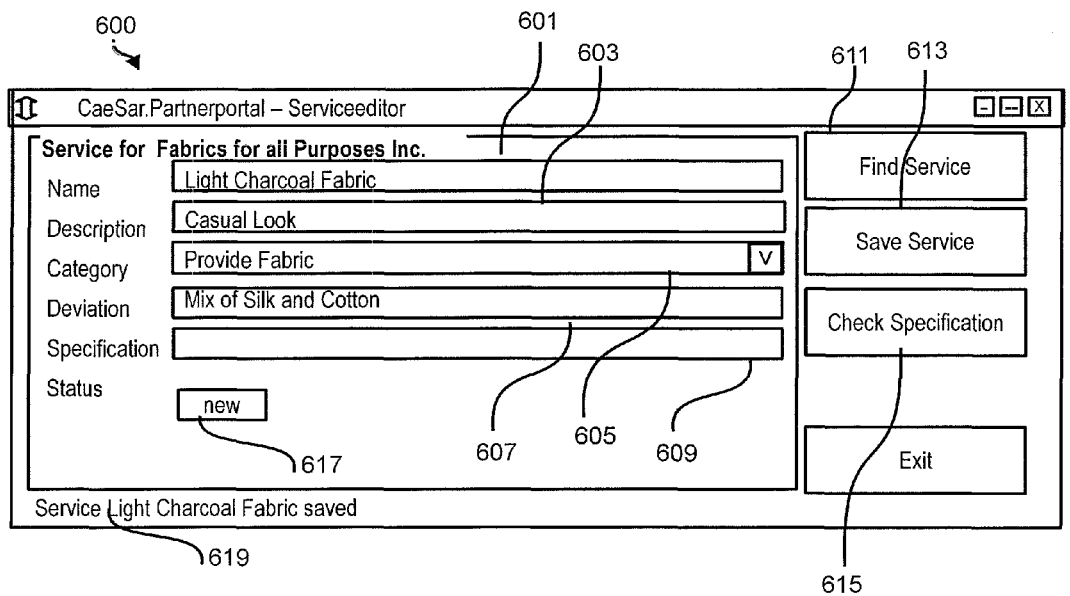
FIG. 6 is a user interface illustrating a screen that initiates a specification definition using a specific grammar, at partner portal.
Figure 7:
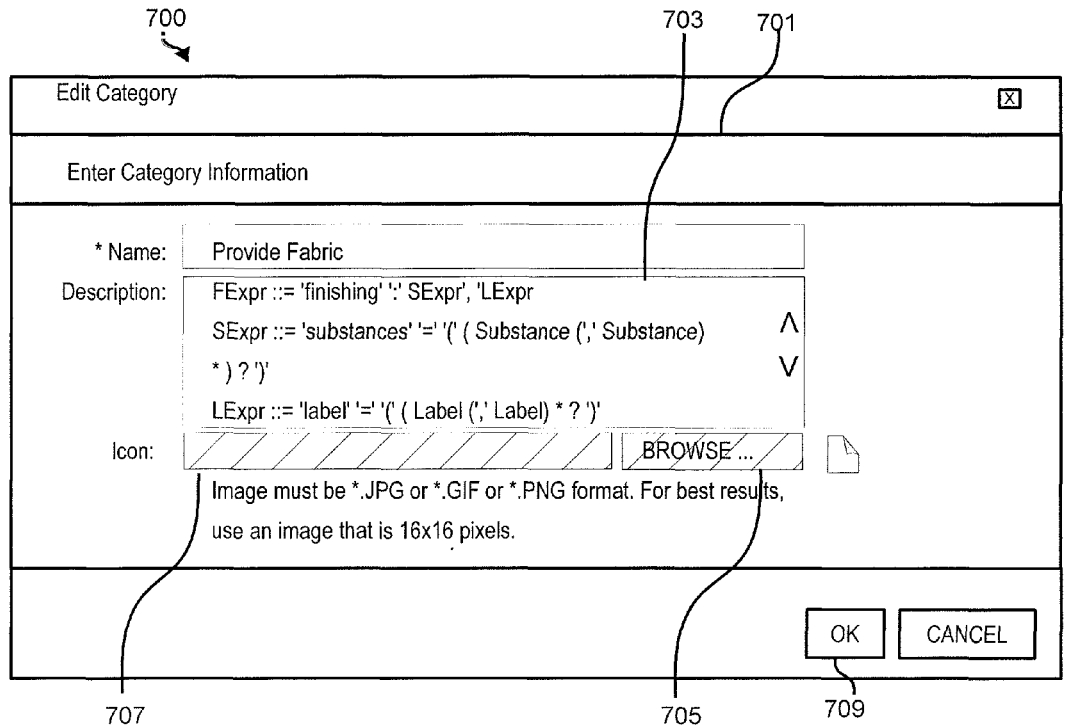
FIG. 7 is a user interface illustrating a screen which inputs a specification for a service, as expressed in the common grammar notation.
Figure 8:
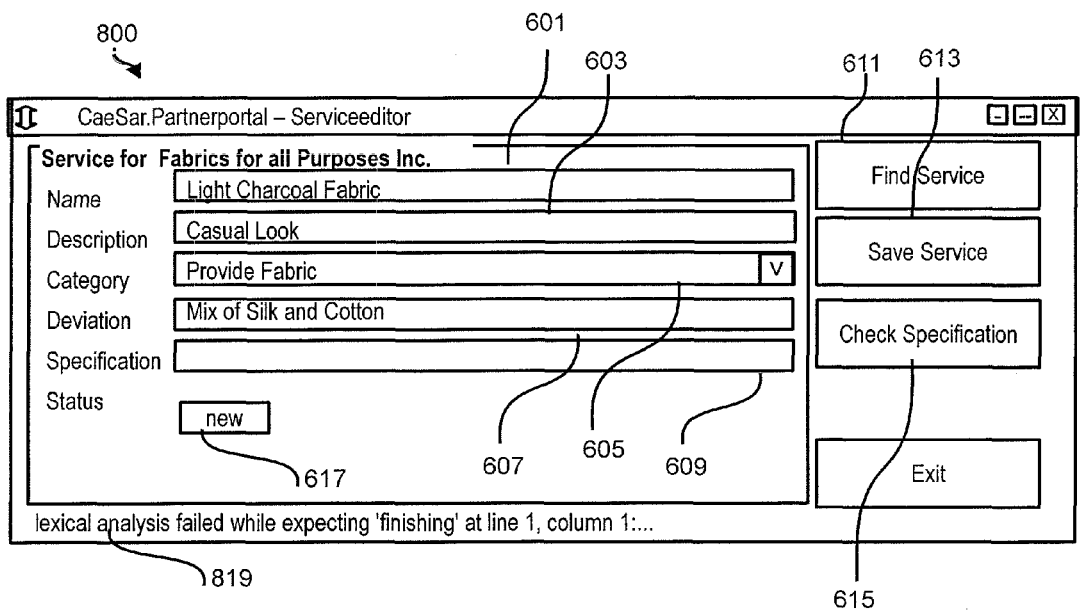
FIG. 8 is a user interface illustrating a further screen for use in specification definition using a common grammar, with an advice message regarding a conformant grammar, at the partner portal.
Figure 9:
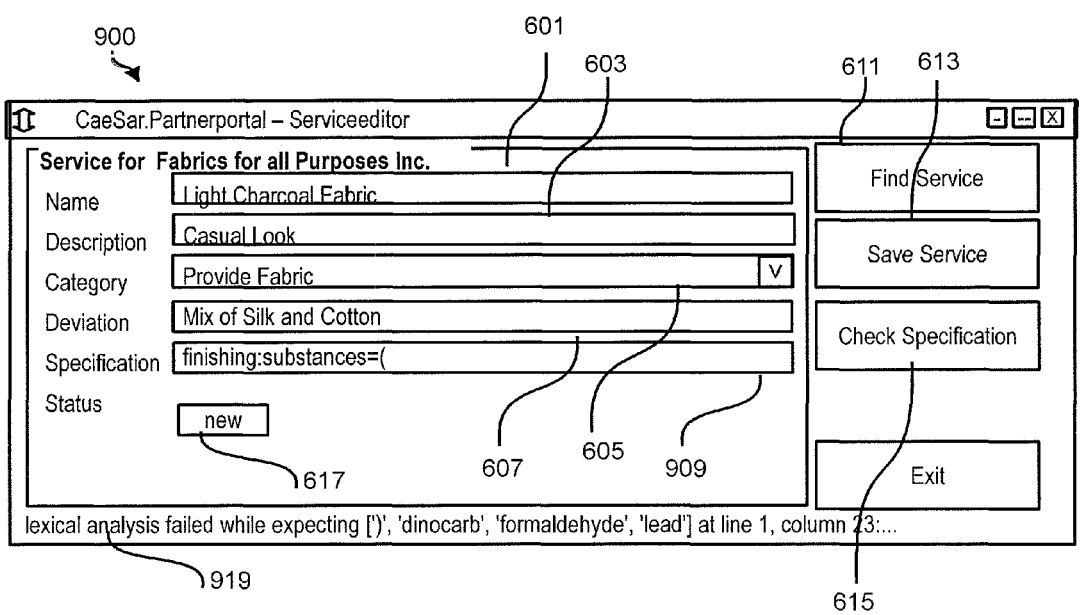
FIG. 9 is a user interface illustrating another screen for use in specification definition using a common grammar, with an advice message regarding a specification in which a grammar analysis fails, at the partner portal.
Figure 10:
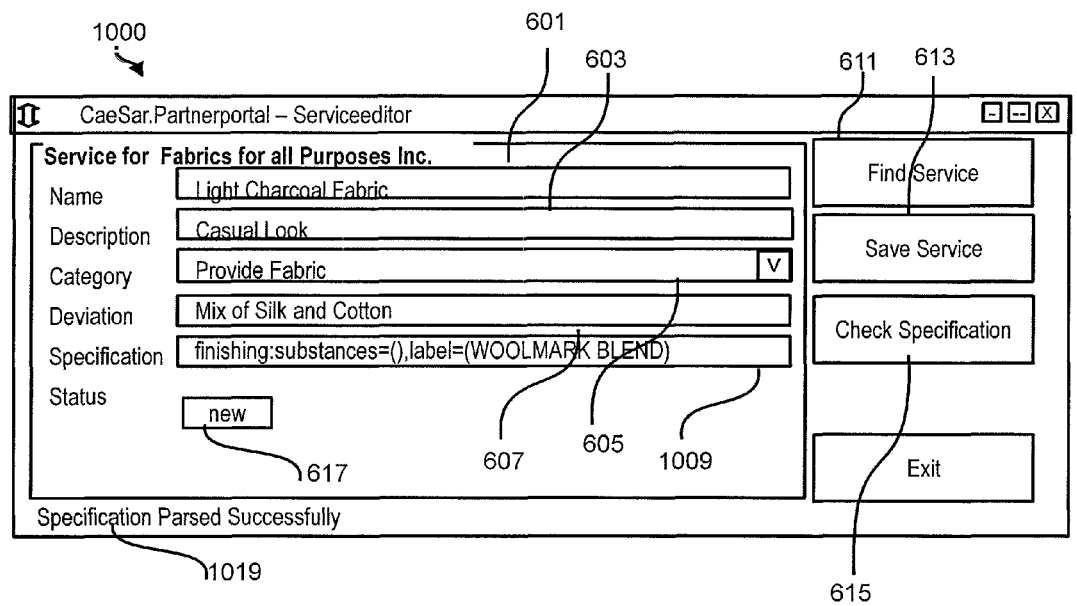
FIG. 10 user interface illustrating another screen for use in specification definition using a common grammar, in which a specification has a conformant grammar, at the partner portal.

By way of overview, FIG. 6 illustrates a user interface with the specification field to receive the formal definition; FIG. 7 is a user interface which displays specification-definition, which is a character string expressed in the common grammar notation, which defines the acceptable content of the specification field; and FIG. 8, FIG. 9 and FIG. 10 are examples of the user interface providing advice messages as to whether the formal definition in the specification field passes a lexical analysis based on the current specification-definition for the category of the service. Each of these is described in more detail below.

Interaction with a user to specify the service offering, such as via a pop-up for a "Specification" field 609, is illustrated in FIG. 6. The user interface 600 of FIG. 6 can be included in a partner portal and includes a screen that can permit input and/or editing of a formal definition which is received into a specification field 609, in which the formal definition should be expressed according to a grammar specific to the category 605. In the specification 609 field, the user, such as a partner offering a service, is obliged to specify to the system the formal definition, which is the information that is currently considered helpful for the respective category to which the service belongs, possibly in a machine-readable, and thus standardized form. Here, the system also can input from the user a name 601 of the service (light charcoal fabric), a description 603 of the service (casual look), a category to which the service belongs (provide fabric) 605, and a deviation 607. The category 605 can determined by receiving a selection from a user from a list of pre-defined service categories as discussed above, as they are categorized in a taxonomy, such as provided conventionally by the SOA. If the service is already categorized, such as happens when the specification field was previously input and is now being edited, the category can be determined from the service name in the taxonomy in the SOA. The deviation 607 can be obtained from the user as discussed above.

To ensure maximum assistance helping formal definitions to adhere to current specification-requirements which are in effect, the information about acceptable specification definitions (that is, the specification-requirements) can be stored in association with the categories in the SOA. Furthermore, the newly input formal definition in the specification field may become part of the confluent definition process described above for the category itself. In variations, it is possible that the system can limit access to edit/input formal definitions and/or the specification-definition so that only the provider can input these, and/or the provider's input and/or authorization of a formal definition or specification-definition may be triggered by customer or partner's input, in this regard.

The interaction with the user, such as via the pop-up described above and in connection with FIG. 7, for defining the service offerings according to the common grammar, can include two features. First, there is provided an entry field "Specification" 609 mentioned above to receive text input from the user, such as a partner, to specify its service along the lines of a formal definition. Second, there is a "Check Specification" instruction 615, for example initiated by a button, which allows access to the current specification-requirements for the category 605 actually chosen for the service to be specified, and checks whether the text input from the user in the specification 609 field as the formal definition of the service is parsable according to the current specification-requirements as a grammar which defines acceptable definitions for such category 605.

The formal definition received as input into the specification 609 field can be notations (character strings) which are intended to be in a grammar, for example as defined in the specification-requirement which can use an EBNF (Extended Backus-Naur Form) to define the expected grammar. EBNF conveniently allows for a rich set of specification possibilities including sequences (for example, the all-over specification can combine descriptive texts to different purposes), recursion (for example, a chemical detergent can consist of chemical detergents) and optionality (for example, there are topics where the provider is expected to say something and topics where it is not required).

The user interface 600 that includes the "Specification" field 609, discussed above, allows the user to describe its service (using formal definitions) in the specification field 609 and then check the content of the specification field 609 against the grammar that is currently in effect for the chosen category 605, in response to a command to check the specification, here provided by the "Check Specification" 615 button. Using the current grammar, the command to check specification can result in a reply, even to an empty specification 609 field. For example, the system can provide a helpful reply (such as including a display of the grammar's definition (e.g., shown in FIG. 7) or a picture thereof) when the check specification 615 button is pressed with an empty specification field 609. As an alternative, a button might bear a different caption depending on whether the specification field 609 is empty, to cause a display of the grammar's definition or image thereof. The following discussion is based on a simple form, that is, the check specification 615 button always yields the parser's reply, but the technique surely allows for more a sophisticated GUI based on these principles.

In the following discussion, assume for the purpose of illustration that the provider takes an interest in the chemical substances the fabric may contain in order to be able to offer clothing suitable for allergic people. An expression that would denote such information as a formal definition of a service would be the following:

finishing:substances=(dinocarb),label=(OEKO-TEX®)

This means to say that from a list of substances that need to be declared, only dinocarb (a fungicide) has been applied to the fabric and the fabric is certified with the OEKO-TEX® label. A suitable common grammar expression in EBNF would thus be along the lines of the following:

FExpr::='finishing' ':'SExpr ',' LExpr
SExpr::='substances' '=' '(' (Substance (',' Substance)*) ?')'
Substance::='dinocarb' | 'formaldehyde' | 'lead'
LExpr::='label' '=''(' (Label (',' Label)*) ?')'
Label::='OEKO-TEX®'| 'OEKO-TEX® 100'| 'OEKO-TEX® 100+' 'WOOLMARK'
| 'WOOLMARK BLEND' | 'TOXPROOF'

Herein, the above EBNF expression is considered to be an example of a "specification-requirement." Of course, many different specification-requirements can be constructed in practice. One will appreciate that the specification-requirement may be edited, expanded, additional details added, and the like.

The above example specification-requirement described in plain English is as follow. A formal definition in a specification field which adheres to this grammar consists first of a beginning expression 'finishing:' followed by a list, which can be empty, of substances in the form 'substances=( . . . )' followed by a comma followed by a list of labels in the form 'labels=( . . . )'. The expressions within the parentheses are lists of terminal symbols separated by commas; one or more of the lists can be empty lists. An example formal definition which is determined to be not acceptable, namely, one which does not adhere to the above grammar currently in effect which is the specification-definition for the category of the service is illustrated in FIG. 9, specification field 909. An example formal definition which is determined to be acceptable, namely, one which adheres to the above grammar currently in effect which is the specification-definition for the category of the service is illustrated in FIG. 10, specification field 1009.

Because one of the grammars belongs respectively to one of the categories, the grammars can conveniently be stored as part of the categories' taxonomy, for example, stored together with and/or in association with the categories' taxonomies.

FIG. 7 is a user interface 700 illustrating a screen of the above grammar being provided in the "description" 703 field (referred to as a "specification-requirement") of category information 701 which corresponds to the service named "Provide Fabric." The grammar may be input and/or modified by a user. When propagating a service, the grammar describing the expected service specification is the one belonging to its category. If the actual category does not have its own grammar, the parental categories in the taxonomy may be checked recursively for a current grammar to use at least initially as the grammar of the actual category.

The user interface 700 of FIG. 7 can also provide an icon field 707 which can receive user input to assign an icon corresponding to the specification-requirement of the category, and also a browse field 705 to locate the icon by browsing. The user interface 700 can also provide a confirmation instruction, here represented by the OK 709 button, to instruct the system that the user in done viewing and/or possibly done editing the specification-requirement in the category information 701. The user interface 700 of FIG. 7 may be implemented as a pop-up window, a separate screen, a pull-down field, or similar, for example initiated by selection of the check specification 615 button or a by separate "edit category" instruction, so that review of the formal definition which adheres to the common grammar (here, expressed in EBNF) is user friendly.

Reference is now made to FIG. 8, which illustrates a user interface 800 at the partner portal for use in checking the specification definition for adherence to the common grammar, and which can provide advice about whether a specification definition in the specification field 609 is conformant to the current grammar for the category 605. Assuming that the above grammar is currently the specification-definition for all fabric-providing services, the check specification instruction, initiated such as by pressing the "Check Specification" 615 button shown in FIG. 8, for use with a newly created service can—by supplying the parser's output in an advice message to the user 819—assist the user in providing a conformant specification. For this purpose the system has read the grammar which is used for the actual, existing category (or its nearest grammar-possessing super-category) from the service registry (for example, CentraSite), created a parser thereof by using a known parser-generator (for example, Rex), and then used the parser which resulted from the currently existing category to parse the formal definition entered into the specification field.

A result of the parser can be provided as an advice message 819. Due to the advice message 819, it is easy for a user to understand what is expected and thus to provide what is needed. In the example of FIG. 9 and FIG. 10, the advice messages regarding the lexical analysis failure details 919 and successful parsing 1019, respectively, can provide the user with the parser's output, and are a form of a help message. A grammar can be of much more help with this task. In alternatives, a GUI can be generated from the grammar or a picture can be provided which graphically exhibits the possible contents of a grammar for the currently existing category. Techniques are known for generating a GUI from a grammar or providing a picture to exhibit the possible content of the grammar, and will not be further described herein.

The grammar can become part of a larger grammar that also covers other topics as exemplified above, for example, an overall-grammar which covers groups of plural services which may be used for use together in a chain. The over-all grammar might be a sequence of sub-grammars pertaining to the various topics and separated by semicolons.

Figure 11:
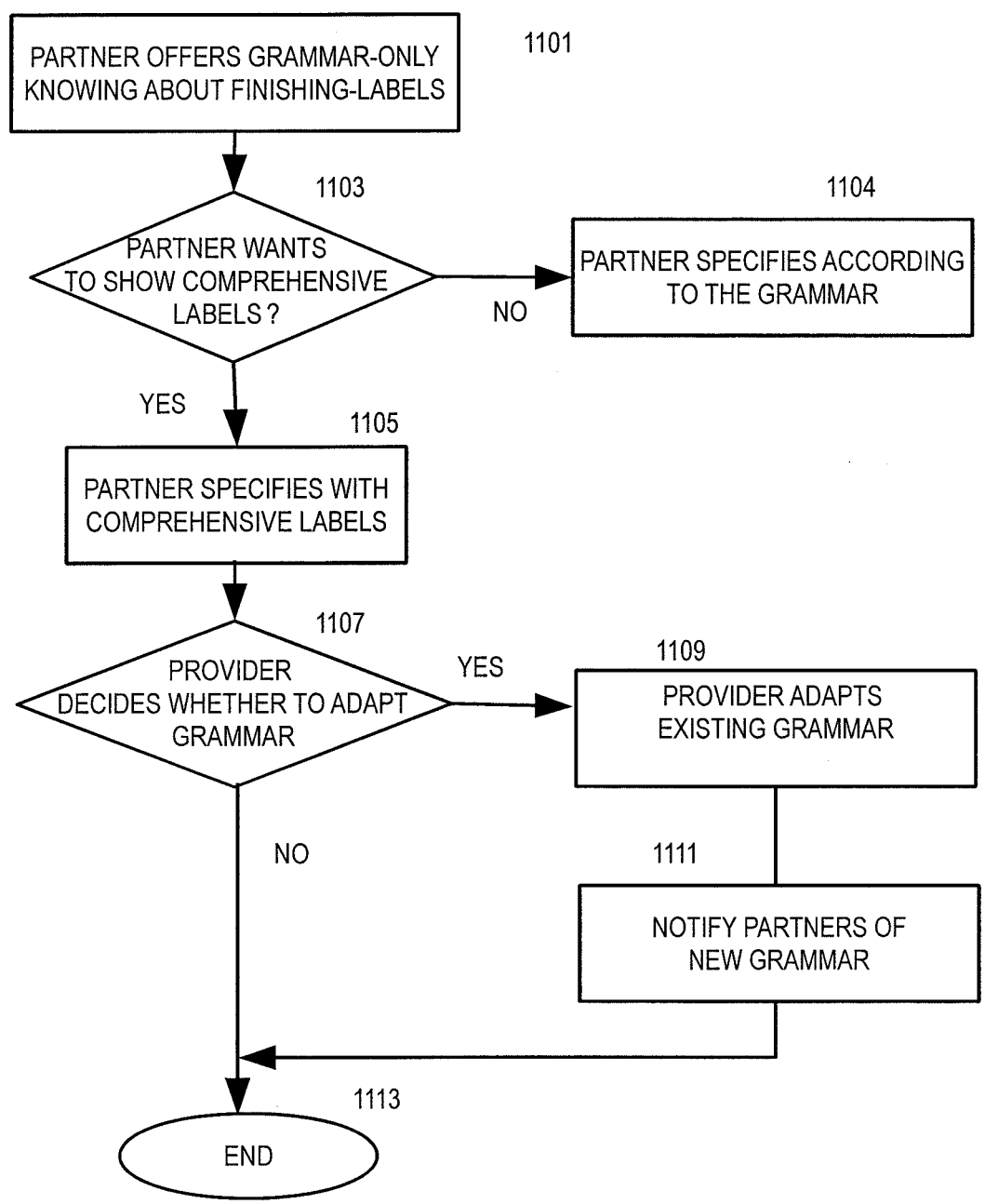
FIG. 11 is a flow chart illustrating a specification offering according to a new grammar.

The fact that the formal definition which is input to the "Specification" 609, 909, 1009 field can be parsed should not say that a service-provider must only provide services that do parse successfully. Analogous to the "Deviation" 607 field which allows the suggestion of amendments to the current category settings, the "Specification" 609, 909, 1009 field can be used to suggest specification aspects for a category that are not yet covered by the specification-requirement. Since familiarity as to how to handle grammars is not common knowledge of a typical user of the user interface, modifications to a specification-definition grammar corresponding to a service category may be best left to the provider. However, as illustrated in the example of FIG. 11, partners (as well as customers) can trigger changes here either by providing specifications that suggest grammar changes or by other means. As an example, a partner might be able to claim a certain label as 'Swiss Organic Fabrics', which requires the absence of certain chemical substances as well as the adherence to ethical standards in the fabric production process. This would be best reflected by a grammar that does not only list the labels below 'finishing' but also at the top level. Thus a partner might specify a formal definition such as 'finishing:substances=(   ),label=(WOOLMARK);label= (Swiss Organic Fabrics)' to denote that the fabrics provided by the service thus specified do not contain any substance to be declared, are substance-free as required by the WOOLMARK label and, in addition, fulfill the requirements of the label "Swiss Organic Fabrics" with regard to both the finishing and the ethical aspects. Although such a formal definition might not adhere to the current grammar, this may trigger the provider to adjust its grammar for fabric providing services to generally cater to labels spanning more than one aspect.

More specifically, in the process illustrated in FIG. 11, a partner offers 1101 a current grammar which only knows about finishing labels, and thus formal definitions regarding only finishing labels will adhere to the current grammar. The partner determines 1103 whether s/he wants to show comprehensive labels. If no, then the process allows the partner to specify 1104 the formal definition according to the current grammar. On the other hand, if it is determined 1103 to show comprehensive labels, then the process allows the partner to specify 1105 comprehensive labels, which will be rejected as not adhering to the current grammar and thus unacceptable. Then, the process will allow the provider to decide 1107 whether or not to adapt the grammar to the comprehensive labels specified by the partner. If yes, then the process can interact with the provider 1109 to adapt the currently existing grammar (and to store the adapted grammar as the new, current grammar to use instead of the now-outdated grammar); then the process and notify 1109 partners of the new, updated grammar so that the partners can provide specification-definitions accordingly. Alternatively, it is not required for the provider to adapt the grammar for the comprehensive labels. Then, the process can end 1113.

The fact that a formal definition input to the specification field can be prompted, if not required, to adhere to the current grammar, at least at a certain point in time, can be useful in cases where the grammar is modified in a way that possibly makes the old formal definitions non-conformant.

When undergoing a change in the grammar, such as adding a new element as in the above example, having a parser for the former grammar can assist enormously in dealing with the entries which were formerly conformant with this now-outdated grammar. One example for adaptions to a new grammar would be to introduce a new top-level element "vegan" for fabric providing services which may only be present if the complete service avoids the exploitation of animals. By being able to parse all entries for the category using the old grammar associated with the grammar, the provider can easily create an automaton that reacts upon these following an appropriate strategy. One possible strategy is to add the "vegan" level automatically for those services possessing a label that includes the vegan claim, and to send a notification (such as a text or e-mail) to providers of services that only use non-animal substances and thus should consider adding the new "vegan" element.

The means of specification introduced so far support the description of static properties of the specified services, in our example, the chemical properties of the fabrics provided. EBNF grammars are capable of describing languages far more complex than what was exemplified above, namely languages that can be used for executable statements.

FIG. 12 to FIG. 14 are now used to illustrate a discussion which uses the common grammar in connection with a chain of services. By using the common grammar expressed in a form such as EBNF, for several services the provider has the chance to not only assemble a chain of such services to form one instance of the executable overall process, but to simulate the execution of the services in the chain, one after the other. For this purpose the provider either uses some software equivalent of "no processing occurred yet" or starts with some other null-valued starting-point and executes the specifications provided with the services one after the other, in the same sequence in which the real services would be applied to the real world equivalents.

For this scenario, XML is conveniently used to describe the situations between the service's (or rather their corresponding specification's) executions and suitable subsets of XQuery for the specifications. It should be understood that the XML code provided herein merely is a convenient example to illustrate the principles, and should not be considered limiting. A suitable starting-point for a suit-to-be would be the XML document of FIG. 12.

A first service to start the suit production chain is the ordering of fabrics. A specification of such a service would be an XQuery statement that adds something to the document's "material" element, preferably something that also contains information about the fabrics as its detergents and/or labels as exemplified above. Also, the XQuery would turn the state of the document into something like "fabric delivered." A subsequent step in the process chain might be the delivering of other materials as buttons. This service would add to the respective element and turn the state into something like "all materials assembled." Subsequent services will add to the "parts" element and possibly set the state to "completed."

A possible result of this virtual suit-production, which is a virtual execution of the chain of services, could look like the XML snippet of FIG. 13A-FIG. 13B.

A chain of services can be regarded as correct if the subsequent execution of the corresponding XQuery-valued specifications starting with the given start-document is possible (that is, no errors occurred when applying each XQuery-valued specification upon the result of the preceding service's execution), and the end-document passes a suitable correctness-check. A correctness-check might be validation against a suitable XML schema specification and/or checking of certain values. In the example provided, there must be valid entries for jacket and trousers (containing a "fabric" sub-element, for example) and a state of "completed." Furthermore, there could be additional requests originating from the customer, for example regarding a certain label.

Given the mechanism described above, the provider can now automatically combine the partner's service offerings into service-chains that provide the expected result, by simulating the chain's execution using XML documents and the XQuery-valued specifications provided with the services by the partners.

In many cases, a certain customer request can probably be fulfilled by different service chains. The provider is free to select whichever chain seems appropriate. For this purpose, the provider can compare the different simulation's results and decide by the description of the produced items, for example preferring results which claim more labels. Since the results can be represented as documents adhering to a certain schema, such comparison can be undertaken automatically, for example if the results are XML-documents, XQuery and/or XSLT are possible means of evaluation.

When additionally using this mechanism to assemble information about properties qualifying the functioning of the selected services themselves, especially utilizing the specification requirements of the categories, the results of the simulation of different chains can become furthermore automatically comparable by utilizing properties for selection that are not shown in the mere results, such as the time necessary to produce the result, the costs, where the services are executed, and the like. These can be categories as "circumstances."

A possible start document for suit-production considering selected "circumstances" can look like the XML snippet of FIG. 14.

When evaluating a chain of services and requesting that the XQuery provided for the service specification adds to the one of more of the circumstance elements of time, cost and/or countries, according to the expected behavior of the real service, the results can become automatically comparable with respect of the chain's execution quality and enable the provider to select chains that offer minimal execution time, minimal costs and/or execution in a restricted set of countries, as requested by the customer and/or estimated by the provider.

VI. Computer and Process Implementation Examples

Figure 15:
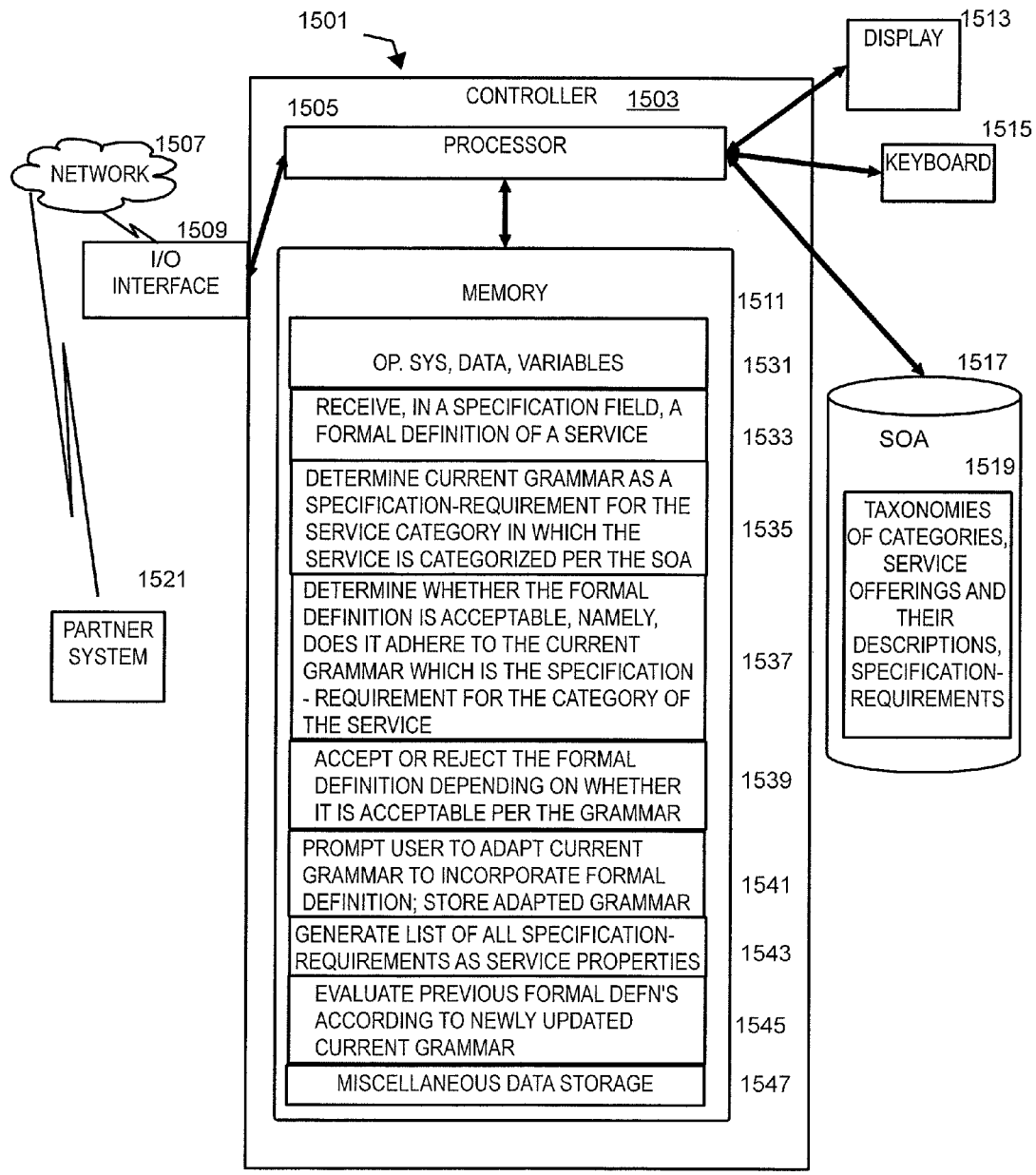
FIG. 15 is an illustration of portions of a computer system.

This section will discuss additional concrete examples of implementation. FIG. 15 illustrates a computer implementation. FIG. 16 illustrates a process to evaluate service definitions, which conveniently may be implemented on the computer of FIG. 15.

Reference is now made to FIG. 15, a block diagram illustrating relevant portions of a computer 1501, on which may be implemented the evaluation of service definitions in a service-oriented architecture (SOA) system which provides service offerings categorized according to service categories using a taxonomy. The computer 1501 may include one or more controllers 1503, a processor 1505, an input/output (i/o) interface 1509 for communication such as via an I/O interface 1509 over a network 1507, a memory 1511, a display 1513 (optional), and/or a user input device (also optional) such as a keyboard 1515. Alternatively, or in addition to the keyboard 1515, a user input device may comprise one or more of various known input devices, such as a keypad, a computer mouse, a touchpad, a touch screen, and/or a trackball. The display 1513 may present information to the user by way of a conventional liquid crystal display (LCD) or other visual display, and/or by way of a conventional audible device (for example, a speaker) for playing out audible messages. Portions of the computer 1501 are well understood to those of skill in this area and have been omitted to avoid obscuring the discussion.

The processor 1505 may comprise one or more microprocessors and/or one or more digital signal processors. The memory 1511 may be coupled to the processor 1505 and may comprise a read-only memory (ROM), a random-access memory (RAM), a programmable ROM (PROM), and/or an electrically erasable read-only memory (EEPROM). The memory 1511 may include multiple memory locations for storing, among other things, an operating system, data and variables 1531 for programs executed by the processor 1505; computer programs for causing the processor to operate in connection with various functions such as to receive 1533, in a specification field, a formal definition of a service; to determine 1535 a current grammar, which is the specification-requirement for the service category in which the service is categorized according to the SOA; to determine 1537 whether the formal definition is acceptable, namely, does it adhere to the current grammar which is the specification-requirement for the category of the service; to accept or reject 1539 the formal definition depending on whether it is acceptable per the grammar; to prompt 1541 the user to adapt the current grammar to incorporate the formal definition and to store the adapted grammar; to generate 1543 a list of all specification-requirements, as possible properties of the services; and to evaluate 1545 previous formal definitions, which are still current, according to a newly updated current grammar. The computer programs may be stored, for example, in ROM or PROM and may direct the processor 1505 in controlling the operation of the computer 1501. Each of these functions is considered in more detail below, to the extent that it is not detailed elsewhere in this document.

The user may invoke functions accessible through the user input device such as the keyboard 1515. Responsive to manual signaling from the user input device represented by the keyboard 1515, in accordance with instructions stored in memory 1511, and/or automatically upon receipt of certain information via the i/o interface 1509, the processor 1505 may direct the execution of the stored programs.

The computer 1501 can utilize client/server techniques. In a client/server embodiment, one or more of the computer programs conveniently may be distributed to the server, and one or more of the computer programs conveniently may be distributed to a client side. In such a situation, the server side may omit the client computer programs, and the client may omit the server computer programs. In another embodiment, the computer programs may be included on a non-client-server architecture.

The processor 1505 may be programmed to receive 1533, in a specification field, a formal definition of a service. An input field may be provided on a user interface, which uses conventional techniques to receive text, for example, via interaction with a user. The text which is input can be used as the formal definition of a service which may be further identified via the user interface. Techniques are known for providing a service, such as by retrieving a description of a service offering 1519 which is in a taxonomy of categories 1519 in a SOA 1517. It is not a conventional technique, however, to store specification-requirements in a SOA 1517.

The processor 1505 may be programmed to determine 1535 a current grammar, which is the specification-requirement for the service category in which the service is categorized according to the SOA 1517. The category in which the service is categorized can be determined, as usual, from the SOA. Then, the specification-requirement for the service category can be determined; for example, the specification-requirements can be stored by the SOA 1517 in connection with the category.

The processor 1505 may be programmed to determine 1537 whether the formal definition is acceptable, namely, does it adhere to the current grammar which is the specification-requirement for the category of the service. That is, the text which was input is checked against the specification-requirement for the service category, which is the current grammar for the category. This can be done by parsing the text of the formal definition according to the current grammar, using known parsing techniques.

The processor 1505 may be programmed to accept or reject 1539 the formal definition depending on whether it is acceptable per the grammar. A message can notify the user as to whether the formal definition is or is not acceptable. Optionally, the message can provide the user with the output of the parsing, which can be helpful in determining how to modify the formal definition so that it follows the specification-requirement.

The processor 1505 may be programmed to prompt 1541 the user to adapt the current grammar to incorporate the formal definition into the grammar to form an adapted grammar, and to store the adapted grammar. It may be convenient for the user that is prompted to be the service provider, so that there is reasonable control over modification of the specification-requirement. A history of current grammars may be stored, as grammars are adapted.

The processor 1505 may be programmed to generate 1543 a list of all specification-requirements, as possible properties of the services. This can be provided by providing a list of all options for all of the specification-requirements, such as for all candidate services that may be used in a chain of service offerings.

The processor 1505 may be programmed to evaluate 1545 previous formal definitions, which are still current, according to a newly updated current grammar. Techniques have been discussed herein for handling formal definitions which were once acceptable but may become unacceptable due to the newly updated current grammar.

As will be understood in this field, besides the functions discussed above, the memory 1511 can include other miscellaneous information in a miscellaneous data storage 1547, along with the usual temporary storage and other instructions for other programs not considered herein.

The computer 1501 can accommodate one or more disk drives or removable storage (not illustrated). Typically, these might be one or more of the following: a flash memory, a floppy disk drive, a hard disk drive, a CD ROM, a digital video disk, an optical disk, and/or a removable storage device such as a USB memory stick, variations and evolutions thereof. The number and type of drives and removable storage may vary, typically with different computer configurations. Disk drives may be options, and for space considerations, may be omitted from the computer used in conjunction with the processes described herein. The computer may also include a CD ROM reader and CD recorder, which are interconnected by a bus along with other peripheral devices supported by the bus structure and protocol (not illustrated). The bus can serves as the main information highway interconnecting other components of the computer, and can be connected via an interface to the computer. A disk controller (not illustrated) can interface disk drives to the system bus. These may be internal or external. The processor 1505, memory 1511, a disk drive and/or removable storage medium are referred to as "computer-readable storage media" and provide non-transitory storage of computer programs and data.

It should be understood that FIG. 15 is described in connection with logical groupings of functions or resources. One or more of these logical groupings may be performed by different components from one or more embodiments. Likewise, functions may be grouped differently, combined, or augmented without parting from the scope. Similarly the present description may describe various databases or collections of data and information. One or more groupings of the data or information may be omitted, distributed, combined, or augmented, or provided locally and/or remotely without departing from the scope.

FIG. 16 is an illustration of a process 1601 to evaluate a service definition, which is input, based on a dynamic grammar. Most of the details implicated by FIG. 16 have been discussed above and are not repeated herein. However, FIG. 16 is useful to illustrate the process and provide a fullness of understanding.

In FIG. 16, the process 1601 will determine 1603 a current grammar which is currently in effect, which is referred to herein as a "specification-requirement" which uses a common grammar to define whether the acceptable definitions are for a service category in which the service is categorized according to an SOA taxonomy. The process also receives 1605 a formal definition of the service, for example, by interacting with a user via a user interface so as to obtain a new formal definition, or to edit a previously-stored formation definition of the service.

As a result of receiving a complete formal definition which is input, the process 1601 can determine 1607 whether the formal definition is acceptable. That is, a determination is made whether the formal definition adheres to the current grammar, which is the specification-requirement for the service's category. For example, the process can perform a lexical analysis of the formal definition to determine whether it meets the requirements set up in the current grammar. Use of EBNF as a common grammar provides a sufficiently succinct way to express the possibilities and desired structure for definitions, and may be apprehended by users with some basic understanding of computer languages such that displaying the common grammar itself may provide a sufficient hint of acceptable possibilities for the formal definition.

When it is determined that the formal definition is acceptable 1609, the process 1601 can accept 1611 the formal definition for inclusion in the SOA, optionally after awaiting authorization from an appropriate user which controls the service category. When it is determined that the formal definition is not acceptable 1609, the process 1601 can reject 1613 the formal definition, optionally to provide notification regarding the unacceptability, such as to provide a result of the lexical analysis. The formal definition can be repeatedly updated, if desired. Consequently, the process 1601 can check 1615 whether the user is done defining the formal definition. If done 1615 defining the formal definition, the process 1601 can end 1617. If not done 1615 defining the formal definition, the process 1601 can loop to receive additional edits for the formal definition It should be understood that any, and/or all, of the service offerings with in the taxonomy of the SOA may be evaluated according to the foregoing. Furthermore, the common grammars of the different service offerings may be updated at will, as discussed above. Accordingly, the foregoing can provide definitions of services, which are dynamically modified to suit changing needs.

V. Glossary

Terms as used herein are intended to be interpreted, at a first level as understood to one of skill in the art of programming and providing a service-oriented architecture; and if not interpretable at the first level, then at a second level as understood to one of skill in the art of computer science and information science; and then if not interpretable according to the first level and second level, according to a more general dictionary.

The claims may use the following terms, which are defined to have the following meanings for the purpose of the claims herein. Other definitions may be specified in this document.

The designation "common grammar" is used herein to mean a grammar expressed in EBNF (Extended Backus-Naur Form) notation or BNF notation; to be expressed in a notation means that there is a string(s) of characters which are in that form; grammar expressed in EBNF notation as used herein means notations which have a form consistent with the ISO 14977 standard EBNF, or BSI (British Standards Institute) 6154, or EBNF from RFC822, or Augmented BNF (ABNF) specified in RFC 4234, or ABNF specified in RFC 5234, or Wirth's BNF (Wirth's article of November 1977), and variations and extensions thereof.

The term "computer system" or "computer" used herein denotes a device sometimes referred to as a computer, laptop, personal computer, tablet computer, handheld computer, smart phone, personal digital assistant, notebook computer, personal assignment pad, server, client, mainframe computer, minicomputer, or evolutions and equivalents thereof.

The phrase "automatically without manual intervention," when used in a claim, is defined to mean that the particular step occurs after the step is initiated until limitations recited in the step are finished without requiring a user to provide input to a processor.

VI. Implementations and Technical Notes

The above discussion has assumed that the reader has a sufficient background for appreciating the points made. This section provides some supplementary implementation and/or technical notes which discuss some basic technical information that may be relevant to the above.

This discussion has involved particular examples. However, the principles may be applied to other examples and/or realizations. Naturally, the relevant data may differ, as appropriate. Further, an embodiment has been discussed in certain examples as if it is made available by a provider to a single customer with a single site. An embodiment may be used by numerous users, if preferred, for example over distributed systems.

It is further understood that the use of relational terms such as first and second, and the like, if any, are used solely to distinguish one from another entity, item, or action without necessarily requiring or implying any actual such relationship or order between such entities, items or actions. It is noted that some embodiments may include a plurality of processes or steps, which can be performed in any order, unless expressly and necessarily limited to a particular order; i.e., processes or steps that are not so limited may be performed in any order.

Much of the inventive functionality and many of the inventive principles when implemented, are best supported with or in software or one or more integrated circuits (ICs), such as a central processing unit (CPU) which is the hardware that carries out instructions of a computer program, and software therefore, and/or application specific ICs. It is expected that one of ordinary skill, notwithstanding possibly significant effort and many design choices motivated by, for example, available time, current technology, and economic considerations, when guided by the concepts and principles disclosed herein will be readily capable of generating such software instructions or ICs with minimal experimentation. Therefore, in the interest of brevity and minimization of any risk of obscuring principles and concepts, further discussion of such software and ICs, if any, will be limited to the essentials with respect to the principles and concepts used by the exemplary embodiments.

The various embodiments which demonstrate a method and/or system for evaluating a service definition according to a dynamically updatable grammar have been discussed in detail above. It should be further noted that the above-described processes can be stored as instructions in computer-readable storage medium. When the instructions are executed by a computer, for example after being loaded from a computer-readable storage medium, the process(es) are performed. The detailed descriptions, which appear herein, may be presented in terms of program procedures executed on a computer or a network of computers. These procedural descriptions and representations herein are the means used by those skilled in the art to most effectively convey the substance of their work to others skilled in the art.

A procedure is generally conceived to be a self-consistent sequence of steps leading to a desired result. These steps are those requiring physical manipulations of physical quantities. Usually, though not necessarily, these quantities take the form of electrical or magnetic signals capable of being stored on non-transitory computer-readable media, transferred, combined, compared and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to these quantities.

Further, the manipulations performed are often referred to in terms such as adding or comparing, which are commonly associated with mental operations performed by a human operator. While the discussion herein may contemplate the use of an operator, a human operator is not necessary, or desirable in most cases, to perform the actual functions described herein; the operations are machine operations.

Various computers or computer systems may be programmed with programs written in accordance with the teachings herein, or it may prove more convenient to construct a more specialized apparatus to perform the required method steps. The required structure for a variety of these machines will be apparent from the description given herein.

A computer-readable storage medium is tangible and non-transitory; a computer-readable storage medium can be any of the memory or storage devices, such as those examples described above, or other removable or fixed storage medium, provided such computer-readable storage medium is tangible and non-transitory.

Furthermore, any communication network implicated in an embodiment can include, by way of example but not limitation, data and/or packet communications networks, which can provide wireless communications capability and/or utilize wireline connections such as cable and/or a connector, or similar. Any appropriate communication protocol may be used.

The system used in connection herewith may (or may not) rely on the integration of various components including, as appropriate and/or if desired, by way of example but not limitation, hardware and software servers, applications software, database engines, server area networks, firewall and SSL security, production back-up systems, and/or applications interface software. An embodiment may be, by way of example but not by way of limitation, network-based and may (or may not) utilize a network such as the Internet or other network as an exemplary interface with the user for information delivery.

One or more databases implicated by the above discussion may be, by way of example but not limitation, in a relational database format, but other standard data formats may also be used. Optionally, the various databases may include a known conversion system capable of receiving data in various standard formats.

One or more displays for the system may be developed in connection with, by way of example but not limitation, HTML display format. Although HTML may be a preferred display format, it is possible to utilize alternative display formats for interacting with a user and obtaining user instructions.

This disclosure is intended to explain how to fashion and use various embodiments in accordance with the invention rather than to limit the true, intended, and fair scope and spirit thereof. The invention is defined solely by the appended claims, as they may be amended during the pendency of this application for patent, and all equivalents thereof. The foregoing description is not intended to be exhaustive or to limit the invention to the precise form disclosed. Modifications or variations are possible in light of the above teachings. The embodiment(s) was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally, and equitably entitled.

What is claimed is:

1. A method for a service-oriented architecture (SOA) system which provides service offerings categorized according to service categories using a taxonomy, comprising:
  receiving, by a processor, in a specification field, a formal definition of a service, the formal definition is for inclusion to define one of service offerings of the SOA system;
  determining, by the processor, a current grammar which is currently in effect as a specification-requirement of acceptable definitions for a service category in which the service is categorized according to a taxonomy of the SOA system, the current grammar being a common grammar,
  determining, by the processor, whether the formal definition in the specification field is acceptable, by adhering to the current grammar determined to be currently in effect as the specification-requirement for the category of the service;
  when the formal definition in the specification field is determined to be acceptable according to the current grammar:
    accepting, by the processor, automatically without manual intervention, in response to determining that the formal definition is acceptable, for inclusion to define the service in the SOA system, the formal definition in the specification field for the service;
    modifying, by the processor, automatically without manual intervention, in response to determining that the formal definition is acceptable, the current grammar for the taxonomy of the SOA system to provide an updated grammar for the SOA system in which the formal definition of the service that was received in the specification field is now categorized in the service category; and
    using, by the processor, in governance of the SOA, the updated grammar as the current grammar which defines service offerings of the SOA system in which the formal definition of the service that was received in the specification field is now categorized in the service category;
  and
  when the formal definition is determined to be not acceptable according to the current grammar:
    rejecting, by the processor, automatically without manual intervention, in response to determining that the formal definition is not acceptable, for the service offerings of the SOA system, the formal definition in the specification field for the service.

2. The method of claim 1, wherein
  the common grammar is expressed in Extended Backus-Naur Form (EBNF) notation, and
  further comprising parsing, by the processor, the formal definition, according to the specification-requirement which expresses the common grammar in EBNF notation which determines acceptability of the formal definition.

3. The method of claim 1, further comprising
prompting, by the processor, a user to input an adaption of the current grammar to incorporate the formal definition which was received, to provide an adapted grammar for the service; and
storing, by the processor, in the SOA system, the adapted grammar to use as the current grammar for the service.

4. The method of claim 1, further comprising
modifying, by the processor, the current grammar to provide an updated grammar;
storing, by the processor, in the SOA system, the updated grammar to use as the current grammar for the service; and
notifying, by the processor, partners of the service categories in the SOA of the current grammar which is now updated.

5. The method of claim 1, further comprising
modifying, by the processor, the current grammar to provide an updated grammar;
storing, by the processor, in the SOA system, the updated grammar to use as the current grammar for the service; and
evaluating, by the processor, for the service, the formal definition, which was acceptable under a previous grammar, according to the current grammar which is now updated.

6. The method of claim 1, wherein there are provided a plurality of different common grammars for the services in the SOA system, further comprising
generating, by the processor, information about all of possible specification-requirements, which are service properties, which each of the services can provide, from the different common grammars of the services.

7. The method of claim 1, further comprising, by the processor, causing a display to visualize a user interface to input the formal definition, the user interface comprising
a specification field to receive text input of the formal definition; and
a "check specification" instruction configured to initiate the determining by the processor whether the formal definition in the specification field is acceptable, which returns a message indicating a lexical analysis of the formal definition pursuant to the specification-requirements.

8. A computer for a service-oriented architecture (SOA) system which provides service offerings categorized according to service categories using a taxonomy, comprising:
a memory; and
a processor cooperatively operable with the memory, and configured to, based on instructions stored in the memory,
receive, in a specification field, a formal definition of a service, the formal definition is for inclusion to define one of service offerings of the SOA system;
determine a current grammar which is currently in effect as a specification-requirement of acceptable definitions for a service category in which the service is categorized according to a taxonomy of the SOA system, the current grammar being a common grammar,
determine whether the formal definition in the specification field is acceptable, by adhering to the current grammar determined to be currently in effect as the specification-requirement for the category of the service;
when the formal definition in the specification field is determined to be acceptable according to the current grammar:
accept, automatically without manual intervention, in response to determining that the formal definition is acceptable, for inclusion to define the service in the SOA system, the formal definition in the specification field for the service;
modify, automatically without manual intervention, in response to determining that the formal definition is acceptable, the current grammar for the taxonomy of the SOA system to provide an updated grammar for the SOA system in which the formal definition of the service that was received in the specification field is now categorized in the service category; and
use, in governance of the SOA, the updated grammar as the current grammar which defines service offerings of the SOA system in which the formal definition of the service that was received in the specification field is now categorized in the service category;
and
when the formal definition is determined to be not acceptable according to the current grammar:
reject, automatically without manual intervention, in response to determining that the formal definition is acceptable, for the service offerings of the SOA system, the formal definition in the specification field for the service.

9. The computer of claim 8, wherein
the common grammar is expressed in Extended Backus-Naur Form (EBNF) notation, and
the processor is further configured to parse the formal definition according to the specification-requirement which expresses the common grammar in EBNF notation which determines acceptability of the formal definition.

10. The computer of claim 8, wherein the processor is further configured to
prompt a user to input an adaption of the current grammar to incorporate the formal definition which was received, to provide an adapted grammar for the service; and
store the adapted grammar to use as the current grammar for the service.

11. The computer of claim 8, wherein the processor is further configured to
modify the current grammar to provide an updated grammar,
store the updated grammar to use as the current grammar for the service; and
notify partners of the service categories in the SOA of the current grammar which is now updated.

12. The computer of claim 8, wherein the processor is further configured to
modify the current grammar to provide an updated grammar,
store the updated grammar to use as the current grammar for the service; and
evaluate, for the service, the formal definition, which was acceptable under a previous grammar, according to the current grammar which is now updated.

13. The computer of claim 8, wherein there are provided a plurality of different common grammars for the services in the SOA system, wherein the processor is further configured to
generate information about all of possible specification-requirements, which are service properties, which each of the services can provide, from the different common grammars of the services.

14. The computer of claim 8, further wherein the processor is further configured to cause a display which is cooperatively operable with the processor to visualize a user interface to input the formal definition, the user interface comprising
- a specification field to receive text input of the formal definition; and
- a "check specification" instruction configured to initiate the determining whether the formal definition in the specification field is acceptable, which returns a message indicating a lexical analysis of the formal definition pursuant to the specification-requirements.

15. A non-transitory computer readable medium comprising executable instructions for a method for a service-oriented architecture (SOA) system which provides service offerings categorized according to service categories using a taxonomy, the instructions being executed to perform:
- receiving, in a specification field, a formal definition of a service, the formal definition is for inclusion to define one of service offerings of the SOA system;
- determining a current grammar which is currently in effect as a specification-requirement of acceptable definitions for a service category in which the service is categorized according to a taxonomy of the SOA system, the current grammar being a common grammar;
- determining whether the formal definition in the specification field is acceptable, by adhering to the current grammar determined to be currently in effect as the specification-requirement for the category of the service;
- when the formal definition is determined to be not acceptable according to the current grammar:
  - accepting, automatically without manual intervention, in response to determining that the formal definition is acceptable, for inclusion to define the service in the SOA system, the formal definition in the specification field for the service, when the formal definition in the specification field is determined to be acceptable according to the current grammar;
  - modifying, automatically without manual intervention, in response to determining that the formal definition is acceptable, the current grammar for the taxonomy of the SOA system to provide an updated grammar for the SOA system in which the formal definition of the service that was received in the specification field is now categorized in the service category; and
  - using, in governance of the SOA, the updated grammar as the current grammar which defines service offerings of the SOA system in which the formal definition of the service that was received in the specification field is now categorized in the service category; and
- when the formal definition is determined to be not acceptable according to the current grammar:
  - rejecting, automatically without manual intervention, in response to determining that the formal definition is acceptable, for the service offerings of the SOA system, the formal definition in the specification field for the service.

16. The non-transitory computer readable medium of claim 15, wherein
- the common grammar is expressed in Extended Backus-Naur Form (EBNF) notation, and
- the instructions are further execute to parse the formal definition according to the specification-requirement which expresses the common grammar in EBNF notation which determines acceptability of the formal definition.

17. The non-transitory computer readable medium of claim 15, further comprising instructions executed for
- prompting a user to input an adaption of the current grammar to incorporate the formal definition which was received, to provide an adapted grammar for the service; and
- storing the adapted grammar to use as the current grammar for the service.

18. The non-transitory computer readable medium of claim 15, further comprising instructions executed for
- modifying the current grammar to provide an updated grammar;
- storing the updated grammar to use as the current grammar for the service; and
- notifying partners of the service categories in the SOA of the current grammar which is now updated.

19. The non-transitory computer readable medium of claim 15, further comprising instructions executed for
- modifying the current grammar to provide an updated grammar;
- storing the updated grammar to use as the current grammar for the service; and
- evaluating, for the service, the formal definition, which was acceptable under a previous grammar, according to the current grammar which is now updated.

20. The non-transitory computer readable medium of claim 15, further comprising instructions executed for providing a user interface to input the formal definition, the user interface comprising
- a specification field to receive text input of the formal definition; and
- a "check specification" instruction configured to initiate the determining whether the formal definition in the specification field is acceptable, which returns a message indicating a lexical analysis of the formal definition pursuant to the specification-requirements.

* * * * *